(12) United States Patent
Low et al.

(10) Patent No.: US 11,560,502 B2
(45) Date of Patent: Jan. 24, 2023

(54) COMPOSITIONS (71) Applicant: MEXICHEM FLUOR S.A.de C.V., San Luis Potosi (MX)

(72) Inventors: Robert E. Low, Runcorn (GB); Andrew Sharratt, Runcorn (GB)

(73) Assignee: MEXICHEM FLUOR S.A.DE C.V., San Luis Potosi (MX)

( * ) Notice: Subject to any disclaimer, the term of this patent is extended or adjusted under 35 U.S.C. 154(b) by 3 days.

(21) Appl. No.: 17/352,775

(22) Filed: Jun. 21, 2021

(65) Prior Publication Data

US 2021/0388252 A1    Dec. 16, 2021

Related U.S. Application Data

(62) Division of application No. 15/545,420, filed as application No. PCT/GB2016/050225 on Feb. 1, 2016, now Pat. No. 11,084,962.

(30) Foreign Application Priority Data

Jan. 30, 2015 (GB) ...................... 1501598

(51) Int. Cl.
  *C09K 5/04* (2006.01)
  *C11D 7/50* (2006.01)
  *C09K 3/30* (2006.01)
  *F01K 23/08* (2006.01)
  *F01K 25/10* (2006.01)

(52) U.S. Cl.
  CPC ............... *C09K 5/045* (2013.01); *C09K 3/30* (2013.01); *C11D 7/50* (2013.01); *C11D 7/505* (2013.01); *C11D 7/5018* (2013.01); *C11D 7/5072* (2013.01); *F01K 23/08* (2013.01); *F01K 25/103* (2013.01); *C09K 2205/106* (2013.01); *C09K 2205/122* (2013.01); *C09K 2205/126* (2013.01); *C09K 2205/128* (2013.01); *C09K 2205/40* (2013.01)

(58) Field of Classification Search
  CPC .............. C09K 5/045; C09K 2205/126; C09K 2205/106; C09K 2205/128; C09K 5/044
  See application file for complete search history.

(56) References Cited

U.S. PATENT DOCUMENTS

| 6,054,064 A | 4/2000 | D'Aubarede et al. |
| 6,065,305 A | 5/2000 | Arman et al. |
| 6,076,372 A | 6/2000 | Acharya et al. |
| 6,297,168 B1 | 10/2001 | Shieh et al. |

(Continued)

FOREIGN PATENT DOCUMENTS

| CN | 1183451 A | 6/1998 |
| CN | 1347950 A | 5/2002 |

(Continued)

OTHER PUBLICATIONS

Intenational Searh Report for Related International Application No. PCT/GB2014/052321, 5 pages, dated Nov. 25, 2014.

(Continued)

*Primary Examiner* — John R Hardee
(74) *Attorney, Agent, or Firm* — Crowell & Moring LLP; Yuezhong Feng (57) ABSTRACT

The present invention provides a composition, such as a refrigerant composition comprising 1,1-difluoroethene (vinylidene fluoride, R-1132a); trifluoromethane (R-23); and one or more compound selected from hexafluoroethane (R-116), ethane (R-170) and carbon dioxide (R-744, $CO_2$).

17 Claims, 1 Drawing Sheet

(56) References Cited

U.S. PATENT DOCUMENTS

| | | |
|---|---|---|
| 8,808,570 B2 | 8/2014 | Low |
| 8,808,571 B2 | 8/2014 | Low |
| 8,961,811 B2 | 2/2015 | Minor et al. |
| 8,961,812 B2 | 2/2015 | Minor et al. |
| 9,309,450 B2 | 4/2016 | Low |
| 2002/0140118 A1 | 10/2002 | Lee |
| 2008/0053908 A1 | 3/2008 | Chordia et al. |
| 2008/0230738 A1 | 9/2008 | Minor et al. |
| 2010/0181524 A1 | 7/2010 | Elsheikh et al. |
| 2011/0252801 A1 | 10/2011 | Minor et al. |
| 2011/0253927 A1 | 10/2011 | Minor et al. |
| 2013/0119299 A1 | 5/2013 | Low |
| 2013/0126776 A1 | 5/2013 | Low |
| 2013/0126777 A1 | 5/2013 | Low |
| 2013/0126778 A1 | 5/2013 | Low |
| 2013/0153817 A1 | 6/2013 | Singh et al. |
| 2016/0018135 A1 | 1/2016 | Yuzawa et al. |
| 2016/0215193 A1 | 7/2016 | Low |

FOREIGN PATENT DOCUMENTS

| | | |
|---|---|---|
| CN | 1347951 A | 5/2002 |
| CN | 101135509 A | 3/2008 |
| CN | 101285657 A | 10/2008 |
| CN | 101434831 A | 5/2009 |
| DE | 102007057262 A1 | 5/2009 |
| GB | 1313615 | 4/1973 |
| WO | WO 2009/137656 A1 | 11/2009 |
| WO | WO 2010/042781 A2 | 4/2010 |
| WO | WO 2011/144909 A2 | 11/2011 |
| WO | WO 2012/157765 A1 | 11/2012 |
| WO | WO 2012157763 A1 | 11/2012 |
| WO | WO 2014/134821 A1 | 9/2014 |
| WO | WO 2014/156190 A1 | 10/2014 |
| WO | WO 2014/159315 A1 | 10/2014 |
| WO | WO 2015/015188 A1 | 2/2015 |
| WO | WO 2015/147338 A1 | 10/2015 |

OTHER PUBLICATIONS

Kazakov A. et al., *Computational Design of New Refrigerant Fluids Based on Environmental, Safety, and Thermodynamic Characteristics,* Industrial & Engineering Chemistry Research, 2021, 51(38), 12537-12548.

Paulus-Lanckriet M. et al., Proceedings—International Congress of Refrigeration, 19th, The Hague, Aug. 20-25, 1995, vol. 4A, 472-480.

Zenkevich I. et al., Vestnik Sankt-Peterburgskogo Universiteta, Seriya 4: Fizika Khimiya, 1992, 1, 66-70 (with English translation).

COMPOSITIONS

This application is a divisional of U.S. application Ser. No. 15/545,420, filed Jul. 21, 2017, which is a national phase of International Application No. PCT/GB2016/050225, filed Feb. 1, 2016, which claims priority to UK Application No. 1501598.5, filed Jan. 30, 2015, the entireties of all of which are hereby incorporated by reference.

The invention relates to compositions, preferably to heat transfer compositions, and in particular to ultra-low temperature heat transfer compositions which may be suitable as replacements for existing refrigerants such as R-508A, R-508B, R-23 or R-1361.

The listing or discussion of a prior-published document or any background in the specification should not necessarily be taken as an acknowledgement that a document or background is part of the state of the art or is common general knowledge.

Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

Certain refrigerant applications, notably biomedical refrigeration, use low-boiling refrigerant gases to achieve cooling of materials, typically to temperatures of about −85° C. or below. These fluids are sometimes referred to as ultra-low temperature (ULT) or cryogenic refrigerants.

The most commonly used non-flammable ULT refrigerants currently are R-508A and R-508B. The term R-508 is used herein to refer to R-508A and R-508B, which are both mixtures of trifluoromethane (R-23) with hexafluoroethane (R-116) and are rated A1 by the ASHRAE Standard 34 classification.

Typical low-temperature applications of R-508 fluids are normally cascade systems: a first vapour compression refrigeration cycle cools air inside a refrigerated compartment to between about −80 and −95° C. by evaporation of liquid R-508. The gaseous refrigerant is then compressed and condensed in a heat exchanger, where it vaporises a second refrigerant (for example R-404A). A typical condensing temperature for R-508 in this exchanger is in the range −50 to −30° C., typically about 40° C. The second refrigerant vapour is compressed by a second compressor and is then condensed against ambient air.

The greenhouse (or global) warming potential (GWP) of low boiling non-flammable refrigerant gases such as R-508 or R-23 is high (e.g. about 13000), and it is desired to find fluids able to be used in this application with lower GWP, so as to reduce the environmental impact of refrigerant leakage.

In looking for alternative low temperature refrigerants several other factors must also be considered. Firstly, if the fluid is to be used as a retrofit or conversion fluid in existing equipment, or as a "drop-in" to new equipment using an essentially unchanged R-508 system design, then non-flammability is highly desired, as the existing design will have been based on the use of non-flammable fluid.

If an alternative fluid is to be employed in a wholly new system design then a degree of flammability may be tolerable; but the use of highly flammable fluids may impose cost and performance penalties to mitigate hazards. Acceptable charge size (refrigerant mass) in a system is also governed by the flammability classification of the fluid, with class 3 fluids, such as ethane, being the most strictly limited. In this case a weaker flammability characteristic is highly desirable since it may allow larger system charges.

Thirdly, the typical application of such fluids is in commercial or laboratory based equipment and so the systems will be located in buildings. It is therefore desirable to have acceptably low toxicity as a characteristic of the fluid.

Furthermore, the volumetric capacity (a measure of the cooling power achievable by a given size of compressor) and energy efficiency are important. This is especially so in cascade operation as inefficiency in the low temperature stage also increases power consumption of the compressor in the top stage of the cascade.

R-170 (ethane) has very low GWP, acceptable refrigeration performance and toxicity but its high flammability limits its application: for example safety regulations can restrict the maximum charge quantity of refrigerant in appliances.

Binary mixtures of R-170 with R-116 have been described by Zhang et al. (J Chem Eng Data 2005 50 2074-2076 and Fluid Phase Equilibria 2006 240 73-78). They identified an azeotropic binary composition of these two components.

R-744 (carbon dioxide) is non-flammable but cannot be used alone in the bottom stage of ULT cascade systems because the operating temperatures are below the triple point of R-744. This means that solid carbon dioxide (dry-ice) could form in low pressure sections of the system, leading to blockages, poor control and inefficient operation.

Binary mixtures of R-744 with R-116 have been described by Valtz et al (Fluid Phase Equilibria 258 (2007) 179-185). They identified an azeotropic binary composition of these two components.

R-1132a (1,1-difluoroethene, also known as vinylidene fluoride) also has low GWP and acceptable toxicity. The flammability of R-1132a is reduced compared to ethane but it is still in flammability class 2. U.S. Pat. No. 6,054,064 describes the use of R-1132a in certain refrigerant compositions including mixtures with R-23, R-32, R-125, R-134a and R-143a. The thermodynamic energy efficiency of pure R-1132a is close to that of R-508 but its refrigeration capacity is reduced.

Thus there is a need to provide alternative refrigerants having improved properties such as low GWP, yet possessing acceptable refrigeration performance, flammability characteristics and toxicology. There is also a need to provide alternative refrigerants that may be used in existing devices such as refrigeration devices with little or no modification.

The subject invention addresses the above and other deficiencies by the provision of a composition comprising 1,1-difluoroethene (vinylidene fluoride, R-1132a), trifluoromethane and one or more compounds selected from hexafluoroethane (R-116), ethane (R-170) and carbon dioxide (R-744, $CO_2$).

Also provided is the use of the compositions of the invention as refrigerants, preferably ultra-low temperature refrigerants. The ultra-low temperatures reached by the compositions of the invention may be −70° C. or below, such as −80° C. or below, preferably −85° C. or below, or even −90° C. or below.

Surprisingly, it has been found that the compositions of the invention exhibit further enhanced refrigeration capacities compared to R-23 and reduced flammability compared to R-1132a.

Compositions of the invention may comprise:
i) 1,1-difluoroethene (vinylidene fluoride, R-1132a);
ii) trifluoromethane (R-23); and
iii) one or more compound selected from hexafluoroethane (R-116) and/or ethane (R-170); and
iv) carbon dioxide (R-744, $CO_2$).

In an embodiment, compositions of the invention comprise:
i) 1,1-difluoroethene (vinylidene fluoride, R-1132a);
ii) trifluoromethane (R-23); and
iii) one or more compound selected from hexafluoroethane (R-116) and/or ethane (R-170); and
iv) less than about 50% by weight carbon dioxide (R-744, $CO_2$).

The compositions of the invention may contain about 15% by weight or less of carbon dioxide, such as about 10% by weight or less carbon dioxide.

Advantageously, compositions of the invention may comprise from about 1 to about 98% by weight R-1132a and/or from about 1 to about 98% by weight R-23.

Preferably the compositions may contain from about 35 to about 95% by weight R-1132a, such as from about 35 to about 90% by weight, from about 35 to about 85% by weight R-1132a, or from about 37 to about 80% by weight R-1132. Even more preferably the compositions may comprise from about 40 to about 60% by weight R-1132a.

Advantageously, compositions may contain from about 1 to about 90% by weight R-23, such as from about 1 to about 75% by weight R-23, e.g. from about 60 to about 70% by weight R-23 or from about 1 to about 40% by weight R-23. Composition of the invention may contain from about 1 to about 30% by weight R-23, such as from about 1 to about 25% by weight R-23 or from about 5 to about 25% by weight R-23, from about 7 to about 22% by weight R-23 or from about 1 to about 20% by weight R-23.

Preferably, compositions may comprise up to about 80% by weight R-116, such as from about 1 to about 60% by weight R-116. Even more preferably, the compositions may comprise from about 1 to about 50% by weight, such as from about 1 to about 40% by weight R-116, from about 1 to about 30% by weight R-116, or from about 5 to about 25% by weight R-116.

Preferably, compositions comprise from greater than zero to about 40% by weight R-116, from about 5 to about 98% by weight R-1132a and from about 5 to about 98% by weight R-23; such as from about 1 to about 30% (e.g. from about 1 to about 15%) by weight R-116, from about 20 to about 90% (e.g. from about 35 to about 60%) by weight R-1132a and from about 5 to about 95% (e.g. from about 20 to about 50%) by weight R-23.

Advantageous compositions comprise from about 1 to about 25% by weight R-116, from about 30 to about 80% by weight R-1132a and from about 5 to about 90% by weight R-23.

Preferably, compositions comprise from about 1 to about 20% by weight R-116, from 40 to about 80% by weight and from about 5 to about 30% by weight R-23. Alternatively, compositions may contain from about 1 to about 20% by weight R-116, from about 40 to about 60% by weight R-1132a and from about 50 to about 70% by weight R-23.

Advantageously, compositions may comprise from about 1 to about 15% by weight R-116, from about 45 to about 60% by weight R-1132a and from about 1 to about 25% by weight R-23.

In an embodiment, the compositions of the invention comprise up to about 40% by weight R-170, preferably from about 1 to about 30% by weight R-170.

Advantageously, the compositions of the invention may comprise from about 1 to about 25% by weight R-170, such as from about 5 to about 25% by weight.

Preferably, compositions comprise from about 1 to about 40% by weight R-170, from about 5 to about 98% by weight R-1132a and from about 5 to about 98% by weight R-23; such as from about 1 to about 30% by weight R-170, from about 20 to about 90% by weight R-1132a and from about 5 to about 95% by weight R-23

Advantageous compositions comprise from about 1 to about 25% by weight R-170, from about 30 to about 80% by weight R-1132a and from about 5 to about 90% by weight R-23.

Preferably, compositions comprise from about 1 to about 20% by weight R-170, from 40 to about 80% by weight and from about 5 to about 30% by weight R-23. Alternatively, compositions may contain from about 1 to about 15% by weight R-170, from about 40 to about 60% by weight R-1132a and from about 50 to about 70% by weight R-23.

Advantageously, compositions may comprise from about 1 to about 10% by weight R-170, from about 45 to about 60% by weight R-1132a and from about 1 to about 25% by weight R-23.

In an aspect of the invention, the compositions do not contain, or are substantially free of, carbon dioxide.

In an alternative aspect, the composition of the invention may contain from about 1 to about 45% by weight carbon dioxide, such as from about 1 to about 35% by weight carbon dioxide, preferably from about 1 to about 30% by weight carbon dioxide, even more preferably from about 1 to about 15% by weight carbon dioxide, or even from about 1 to about 10% by weight carbon dioxide.

Preferably, compositions comprise from about 35 to about 95% by weight R-1132a, from about 1 to about 75% by weight R-23, from about 1 to about 60% by weight R-116 and from about 1 to about 35% by weight carbon dioxide.

Advantageously, compositions comprise from about 30 to about 85% by weight R-1132a, from about 1 to about 40% by weight R-23 and from about 1 to about 15% by weight carbon dioxide.

Preferably, compositions comprise from about 40 to about 70% by weight R-1132a, from about 1 to about 30% by weight R-23 and from about 1 to about 10% by weight carbon dioxide; such as from about 45 to about 70% by weight R-1132a, from about 1 to about 25% by weight R-23 and from about 1 to about 7% by weigh carbon dioxide, or even from about 45 to about 70% by weight R-1132a, from about 1 to about 25% by weight R-23 and from about 1 to about 5% by weigh carbon dioxide.

In an embodiment, the composition of invention comprise both R-116 and R-170. Preferably, the composition comprises R-116 and R-170 in the amounts specified above.

In an embodiment, the compositions may contain from about 35 to about 95% by weight R-1132a, from about 1 to about 75% by weight R-23, from about 1 to about 50% by weight R-116 and from about 1 to about 40% by weight R-170.

Preferably, the compositions comprise from about 35 to about 70% by weight R-1132a, from about 1 to about 40% by weight R-23, from about 1 to about 40% by weight R-116 and from about 1 to about 30% by weight R-170; such as from about 40 to about 70% by weight R-1132a, from about 1 to about 30% by weight R-23, from about 1 to about 30% by weight R-116 and from about 1 to about 15% by weight R-170.

In an embodiment, the compositions comprise from about 35 to about 95% by weight R-1132a, from about 1 to about 75% by weight R-23, from about 1 to about 50% by weight R-116 and from about 1 to about 40% by weight carbon dioxide.

Preferably, the compositions comprise from about 35 to about 70% by weight R-1132a, from about 1 to about 40% by weight R-23, from about 1 to about 40% by weight R-116 and from about 1 to about 15% by weight carbon dioxide; such as from about 40 to about 70% by weight R-1132a, from about 1 to about 30% by weight R-23, from about 1 to about 30% by weight R-116 and from about 1 to about 10% by weight R-170.

In an embodiment, the compositions comprise from about 35 to about 95% by weight R-1132a, from about 1 to about 75% by weight R-23, from about 1 to about 30% by weight R-170 and from about 1 to about 40% by weight carbon dioxide.

Preferably, the compositions comprise from about 35 to about 70% by weight R-1132a, from about 1 to about 40% by weight R-23, from about 1 to about 20% by weight R-170 and from about 1 to about 15% by weight carbon dioxide.

Preferably, the compositions comprise from about 40 to about 70% by weight R-1132a, from about 1 to about 30% by weight R-23, from about 1 to about 10% by weight R-170 and from about 1 to about 10% by weight R-170.

In an embodiment, the composition comprises R-1132a, R-23, R-116, R-170 and carbon dioxide.

In some preferred embodiments, the composition comprises about 1 to about 98% by weight R-1132a, about 1 to about 98% by weight R-23 and about 1 to about 50% by weight carbon dioxide. For example, the composition may comprise about 35 to 98% by weight R-1132a, about 1 to about 60% by weight R-23 and about 1 to about 20% by weight carbon dioxide. In some of these embodiments, the composition may comprise about 40 to about 60% by weight R-23, for example about 45 to about 55% by weight R23. It is preferred that any of such compositions comprise about 4 to about 16% by weight carbon dioxide.

Any of the above described compositions may further contain a hydrocarbon, wherein the hydrocarbon is in addition to any ethane present in the composition. Advantageously, the hydrocarbon is one or more compound(s) selected from the group consisting of propane, propene, isobutane, n-butane, n-pentane, isopentane and mixtures thereof. In a preferred embodiment, the hydrocarbon comprises n-pentane.

Without being bound by theory, it is believed that, when present, the inclusion of ethane and/or an additional hydrocarbon compound may enhance oil miscibility, solubility and/or return characteristics. Preferably, the compositions of the invention preferably contain from about 1 to about 50% by weight of the hydrocarbon component, for example from about 1 to about 20%.

In an embodiment, the compositions may consist essentially of the stated components.

By the term "consist essentially of", we mean that the compositions of the invention contain substantially no other components, particularly no further (hydro)(fluoro)compounds (e.g. (hydro)(fluoro)alkanes or (hydro)(fluoro)alkenes) known to be used in heat transfer compositions. The term "consist of" is included within the meaning of "consist essentially of".

In an embodiment, the compositions of the invention are substantially free of any component that has heat transfer properties (other than the components specified). For instance, the compositions of the invention may be substantially free of any other hydrofluorocarbon compound.

By "substantially no" and "substantially free of", we include the meaning that the compositions of the invention contain 0.5% by weight or less of the stated component, preferably 0.1% or less, based on the total weight of the composition.

The compositions of the invention may be azeotropic.

By azeotropic composition, we include the meaning of a composition which at vapour-liquid equilibrium has the same composition in both phases, and whose boiling point is lower than that of the pure components, All the azeotropic compositions of the invention have been found to exhibit a positive deviation from ideality. By near-azeotropic composition we include the meaning of liquid compositions whose vapour pressure is above that of the pure component with the lower boiling point when measured at equivalent temperature, but whose equilibrium vapour composition may differ from the liquid composition.

All of the chemicals herein described are commercially available. For example, the fluorochemicals may be obtained from Apollo Scientific (UK) and carbon dioxide may be obtained from liquefied gas suppliers such as Linde AG.

As used herein, all % amounts mentioned in compositions herein, including in the claims, are by weight based on the total weight of the compositions, unless otherwise stated.

By the term "about", as used in connection with numerical values of amounts of components in % by weight, we include the meaning of ±0.5% by weight, for example ±0.2% by weight or ±0.1% by weight.

For the avoidance of doubt, it is to be understood that the stated upper and lower values for ranges of amounts of components in the compositions of the invention described herein may be interchanged in any way, provided that the resulting ranges fall within the broadest scope of the invention.

The compositions of the invention have zero ozone depletion potential

Typically, the compositions of the invention have a GWP of less than about 12000, such as less than about 11000.

In one embodiment, the compositions of the invention have a GWP of less than about 11000, preferably less than about 10500 or about 10000 or about 9000 or about 8000.

In one aspect, the compositions of the invention comprising R-1132a, R-116 and R-23 have a GWP of less than about 11000, for instance less than about 10000, e.g. from about 100 to about 10000, or from about 100 to about 7000

In one embodiment, the compositions of the invention comprising R-1132a, R-23, R-116 and $CO_2$ have a GWP of less than about 10000, for instance less than about 9000, e.g. from about 1000 to about 8000, or from about 2000 to about 7000.

Typically, the compositions of the subject invention are of reduced flammability hazard when compared to R-1132a.

Flammability may be determined in accordance with ASHRAE Standard 34 incorporating the ASTM Standard E-681 with test methodology as per Addendum 34p dated 2004, the entire content of which is incorporated herein by reference.

In some embodiments, the compositions have one or more of (a) a higher lower flammable limit; (b) a higher ignition energy (sometimes referred to as auto ignition energy or pyrolysis); or (c) a lower flame velocity compared to R-1132a alone. Preferably, the compositions of the invention are less flammable compared to R-1132a in one or more of the following respects: lower flammable limit at 23° C.; lower flammable limit at 60° C.; breadth of flammable range at 23° C. or 60° C.; auto-ignition temperature (thermal decomposition temperature); minimum ignition energy in dry air or flame speed. The flammable limits being determined according to the methods specified in ASHRAE-34 and the auto-ignition temperature being determined in a 500 ml glass flask by the method of ASTM E659-78.

In a preferred embodiment, the compositions of the invention are non-flammable. For example, the compositions of the invention are non-flammable at a test temperature of 60° C. using the ASHRAE-34 methodology. Advantageously, the mixtures of vapour that exist in equilibrium with the compositions of the invention at any temperature between about −20° C. and 60° C. are also non-flammable.

In some applications it may not be necessary for the formulation to be classed as non-flammable by the ASHRAE-34 methodology; it is possible to develop fluids whose flammability limits will be sufficiently reduced in air to render them safe for use in the application, for example if it is physically not possible to make a flammable mixture by leaking the refrigeration equipment charge into the surrounds.

In one embodiment, the compositions of the invention have a flammability classifiable as 1 or 2L according to the ASHRAE standard 34 classification method, indicating non-flammability (class 1) or a weakly flammable fluid with flame speed lower than 10 cm/s (class 2L).

A composition of the invention preferably have a temperature glide in an evaporator or condenser of less than about 10 K, even more preferably less than about 5 K, such as less than about 1 K.

The critical temperature of a heat transfer composition should be higher than the maximum expected condenser temperature. This is because the cycle efficiency drops as critical temperature is approached. As this happens, the latent heat of the refrigerant is reduced and so more of the heat rejection in the condenser takes place by cooling gaseous refrigerant; this requires more area per unit heat transferred. The critical temperature of R-508B is about 11° C. (data estimated by REFPROP).

In one aspect, the compositions of the invention have a critical temperature of greater than about 0° C., preferably greater than about 10° C.

It is believed that the compositions of the invention exhibit a completely unexpected combination of low-/non-flammability, low GWP, improved lubricant miscibility and improved refrigeration performance properties. Some of these refrigeration performance properties are explained in more detail below.

The compositions of the invention typically have a volumetric refrigeration capacity that is at least 85% of that of R-508 at comparable cycle conditions. Preferably, the compositions of the invention have a volumetric refrigeration capacity that is at least 90% of that of R-508, for example from about 95% to about 120% of that of R-508.

The compositions of the invention typically are capable of reaching temperatures of −70° C. or lower, preferably −80° C. or lower, for example −85° C. or lower whilst maintaining the evaporation pressure above atmospheric pressure.

In one embodiment, the cycle efficiency (Coefficient of Performance, COP) of the compositions of the invention is within about 5% or even better than the existing refrigerant fluid it is replacing. Conveniently, the compressor discharge temperature of the compositions of the invention is within about 15 K of the existing refrigerant fluid it is replacing, preferably about 10 K or even about 5 K.

The compositions of the invention are typically suitable for use in existing designs of equipment, for example, ULT refrigeration equipment and are compatible with all classes of lubricant currently used with established HFC refrigerants. They may be optionally stabilised or compatibilised with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof. PAGs and POEs are currently preferred lubricants for the compositions of the invention.

Advantageously, the lubricant further comprises a stabiliser.

Preferably, the stabiliser is selected from the group consisting of diene-based compounds, phosphates, phenol compounds and epoxides, and mixtures thereof.

Conveniently, the composition of the invention may be combined with a flame retardant.

Advantageously, the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

In one embodiment, the invention provides a heat transfer device comprising a composition of the invention.

Preferably, the heat transfer device is a refrigeration device.

Conveniently, the heat transfer device is an ultra-low temperature refrigeration system.

Advantageously, the heat transfer device contains a cascade system.

The invention also provides the use of a composition of the invention in a heat transfer device as herein described.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device, more preferably still the device is an ultra-low temperature refrigeration system. Preferably, the refrigeration system cools a compartment to less than about −70° C., preferably less than about −80° C., for example to less than −85° C., or even less than −90° C.

Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

The compositions of the invention may also be prepared simply by mixing the R-1132a, R-23 (and further components such as R-116, R-170, R-744, hydrocarbons, a lubricant, a stabiliser or an additional flame retardant) in the desired proportions. The compositions can then be added to a heat transfer device (or used in any other way as defined herein).

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems (see, for example, http://en.wikipedia.org/wiki/Total_equivalent_warming_impact).

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP, see for example http://www.sae.org/events/aars/presentations/2007papasavva.pdf). The use of LCCP is common in assessing environmental impact of automotive air conditioning systems.

Emission credit(s) are awarded for reducing pollutant emissions that contribute to global warming and may, for example, be banked, traded or sold. They are conventionally expressed in the equivalent amount of carbon dioxide. Thus if the emission of 1 kg of R-134a is avoided then an emission credit of 1×1300=1300 kg $CO_2$ equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and medium temperature refrigeration), heat transfer, aerosols or sprayable propellants, gaseous dielectrics, flame suppression, solvents (e.g. carriers for flavorings and fragrances), cleaners, topical anesthetics, and expansion applications. Preferably, the field is ultra-low temperature refrigeration.

Examples of suitable products include heat transfer devices, sprayable compositions, solvents and mechanical power generation devices. In a preferred embodiment, the product is a heat transfer device, such as a refrigeration device or an ultra-low temperature refrigeration system.

The existing compound or composition has an environmental impact as measured by GWP and/or TEWI and/or LCCP that is higher than the composition of the invention which replaces it. The existing compound or composition may comprise a fluorocarbon compound, such as a per-fluoro-, hydrofluoro-, chlorofluoro- or hydrochlorofluorocarbon compound or it may comprise a fluorinated olefin.

Preferably, the existing compound or composition is a heat transfer compound or composition such as a refrigerant. Examples of refrigerants that may be replaced include ULT refrigerants such as R-508A, R-508B, R-23 and R-1361.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples, with reference to the following drawings.

EXAMPLES

Compositions of R-1132a, R-23 and R-116

The performance of ternary compositions of the invention are provided in the following Tables 2 to 6, which list the volumetric cooling capacity, COP, compressor pressure ratio, compressor discharge temperature and bubble point pressure for a range of ternary compositions. The table ordinates are R-23 and R-1132a content as weight percentages with the R-116 content being inferred by difference.

TABLE 1

Cycle conditions for modelling ternary compositions

| Cycle conditions for modelling | | |
|---|---|---|
| Condensing temperature | °C. | −40 |
| Evaporating temperature | °C. | −85 |
| Suction temperature | °C. | same as evaporator outlet |
| Isentropic efficiency | | 65% |
| Subcooling | K | 5 |
| Evaporator superheat | K | 5 |
| Compressor clearance ratio | | 3% |

TABLE 2

Volumetric cooling capacity in kJ/m³

| R-23 content w/w | R-1132a content w/w | | | | | | | | | | |
|---|---|---|---|---|---|---|---|---|---|---|---|
| | 0% | 5% | 10% | 15% | 20% | 25% | 30% | 35% | 40% | 45% | 50% |
| 0% | 542 | 576 | 607 | 634 | 657 | 678 | 696 | 712 | 725 | 736 | 744 |
| 5% | 566 | 604 | 638 | 668 | 695 | 718 | 738 | 756 | 771 | 783 | 792 |
| 10% | 589 | 631 | 668 | 701 | 730 | 756 | 778 | 798 | 815 | 828 | 838 |
| 15% | 611 | 656 | 696 | 732 | 763 | 791 | 816 | 838 | 856 | 871 | 882 |
| 20% | 631 | 679 | 723 | 761 | 795 | 825 | 852 | 876 | 896 | 912 | 924 |
| 25% | 651 | 702 | 748 | 789 | 825 | 858 | 887 | 912 | 934 | 952 | 964 |
| 30% | 668 | 722 | 771 | 815 | 854 | 888 | 919 | 947 | 970 | 989 | 1002 |
| 35% | 685 | 742 | 793 | 839 | 880 | 916 | 949 | 979 | 1004 | 1025 | 1038 |
| 40% | 700 | 760 | 814 | 862 | 904 | 943 | 978 | 1009 | 1036 | 1058 | 1072 |
| 45% | 714 | 776 | 833 | 883 | 927 | 967 | 1003 | 1037 | 1066 | 1089 | 1104 |
| 50% | 726 | 791 | 850 | 902 | 948 | 989 | 1027 | 1062 | 1093 | 1118 | 1134 |
| 55% | 737 | 804 | 865 | 919 | 966 | 1008 | 1047 | 1083 | 1116 | 1143 | |
| 60% | 747 | 816 | 879 | 934 | 982 | 1025 | 1064 | 1101 | 1135 | | |
| 65% | 755 | 826 | 891 | 947 | 996 | 1039 | 1078 | 1115 | | | |
| 70% | 762 | 835 | 901 | 959 | 1007 | 1050 | 1088 | | | | |
| 75% | 767 | 842 | 910 | 968 | 1017 | 1059 | | | | | |
| 80% | 771 | 847 | 917 | 976 | 1025 | | | | | | |
| 85% | 773 | 851 | 923 | 983 | | | | | | | |
| 90% | 774 | 854 | 928 | | | | | | | | |
| 95% | 773 | 855 | | | | | | | | | |
| 100% | 772 | | | | | | | | | | |

| R-23 content w/w | R-1132a content w/w | | | | | | | | | |
|---|---|---|---|---|---|---|---|---|---|---|
| | 55% | 60% | 65% | 70% | 75% | 80% | 85% | 90% | 95% | 100% |
| 0% | 749 | 752 | 753 | 753 | 751 | 748 | 744 | 739 | 733 | 726 |
| 5% | 798 | 801 | 802 | 802 | 800 | 797 | 794 | 789 | 783 | |
| 10% | 844 | 848 | 849 | 849 | 847 | 845 | 841 | 836 | | |
| 15% | 889 | 893 | 894 | 894 | 892 | 890 | 886 | | | |
| 20% | 931 | 935 | 936 | 936 | 935 | 932 | | | | |
| 25% | 972 | 975 | 976 | 976 | 974 | | | | | |
| 30% | 1010 | 1013 | 1014 | 1013 | | | | | | |
| 35% | 1046 | 1049 | 1049 | | | | | | | |
| 40% | 1080 | 1082 | | | | | | | | |
| 45% | 1111 | | | | | | | | | |
| 50% | | | | | | | | | | |
| 55% | | | | | | | | | | |
| 60% | | | | | | | | | | |
| 65% | | | | | | | | | | |
| 70% | | | | | | | | | | |
| 75% | | | | | | | | | | |
| 80% | | | | | | | | | | |
| 85% | | | | | | | | | | |
| 90% | | | | | | | | | | |
| 95% | | | | | | | | | | |
| 100% | | | | | | | | | | |

TABLE 3

Cooling Coefficient of Performance (COP)

| R-23 content w/w | R-1132a content w/w | | | | | | | | | | |
|---|---|---|---|---|---|---|---|---|---|---|---|
| | 0% | 5% | 10% | 15% | 20% | 25% | 30% | 35% | 40% | 45% | 50% |
| 0% | 2.32 | 2.29 | 2.26 | 2.24 | 2.23 | 2.22 | 2.21 | 2.21 | 2.21 | 2.21 | 2.21 |
| 5% | 2.32 | 2.30 | 2.28 | 2.27 | 2.26 | 2.25 | 2.25 | 2.24 | 2.24 | 2.25 | 2.25 |
| 10% | 2.33 | 2.31 | 2.30 | 2.29 | 2.28 | 2.28 | 2.28 | 2.28 | 2.28 | 2.28 | 2.28 |
| 15% | 2.33 | 2.32 | 2.32 | 2.31 | 2.31 | 2.31 | 2.31 | 2.31 | 2.31 | 2.31 | 2.32 |
| 20% | 2.34 | 2.33 | 2.33 | 2.33 | 2.33 | 2.33 | 2.33 | 2.34 | 2.34 | 2.34 | 2.34 |
| 25% | 2.34 | 2.34 | 2.34 | 2.35 | 2.35 | 2.35 | 2.36 | 2.36 | 2.37 | 2.37 | 2.37 |
| 30% | 2.34 | 2.35 | 2.36 | 2.36 | 2.37 | 2.37 | 2.38 | 2.38 | 2.39 | 2.39 | 2.39 |
| 35% | 2.34 | 2.36 | 2.37 | 2.38 | 2.38 | 2.39 | 2.40 | 2.40 | 2.41 | 2.41 | 2.41 |
| 40% | 2.34 | 2.36 | 2.38 | 2.39 | 2.40 | 2.41 | 2.41 | 2.42 | 2.43 | 2.43 | 2.43 |
| 45% | 2.34 | 2.37 | 2.38 | 2.40 | 2.41 | 2.42 | 2.43 | 2.44 | 2.45 | 2.45 | 2.45 |
| 50% | 2.34 | 2.37 | 2.39 | 2.41 | 2.42 | 2.43 | 2.44 | 2.45 | 2.46 | 2.47 | 2.46 |
| 55% | 2.34 | 2.37 | 2.40 | 2.42 | 2.43 | 2.44 | 2.45 | 2.46 | 2.47 | 2.48 | |
| 60% | 2.34 | 2.37 | 2.40 | 2.42 | 2.44 | 2.45 | 2.46 | 2.47 | 2.48 | | |
| 65% | 2.34 | 2.37 | 2.40 | 2.43 | 2.44 | 2.45 | 2.46 | 2.47 | | | |
| 70% | 2.33 | 2.37 | 2.41 | 2.43 | 2.45 | 2.46 | 2.47 | | | | |
| 75% | 2.33 | 2.37 | 2.41 | 2.43 | 2.45 | 2.46 | | | | | |
| 80% | 2.32 | 2.37 | 2.41 | 2.43 | 2.45 | | | | | | |
| 85% | 2.31 | 2.36 | 2.41 | 2.43 | | | | | | | |
| 90% | 2.31 | 2.36 | 2.40 | | | | | | | | |
| 95% | 2.30 | 2.35 | | | | | | | | | |
| 100% | 2.29 | | | | | | | | | | |

| R-23 content w/w | R-1132a content w/w | | | | | | | | | |
|---|---|---|---|---|---|---|---|---|---|---|
| | 55% | 60% | 65% | 70% | 75% | 80% | 85% | 90% | 95% | 100% |
| 0% | 2.21 | 2.22 | 2.22 | 2.22 | 2.23 | 2.23 | 2.24 | 2.25 | 2.25 | 2.26 |
| 5% | 2.25 | 2.25 | 2.26 | 2.26 | 2.26 | 2.27 | 2.27 | 2.28 | 2.28 | |
| 10% | 2.28 | 2.29 | 2.29 | 2.29 | 2.29 | 2.30 | 2.30 | 2.31 | | |
| 15% | 2.32 | 2.32 | 2.32 | 2.32 | 2.32 | 2.33 | 2.33 | | | |
| 20% | 2.34 | 2.34 | 2.35 | 2.35 | 2.35 | 2.35 | | | | |
| 25% | 2.37 | 2.37 | 2.37 | 2.37 | 2.37 | | | | | |
| 30% | 2.39 | 2.39 | 2.39 | 2.39 | | | | | | |
| 35% | 2.41 | 2.41 | 2.41 | | | | | | | |
| 40% | 2.43 | 2.42 | | | | | | | | |
| 45% | 2.44 | | | | | | | | | |
| 50% | | | | | | | | | | |
| 55% | | | | | | | | | | |
| 60% | | | | | | | | | | |
| 65% | | | | | | | | | | |
| 70% | | | | | | | | | | |
| 75% | | | | | | | | | | |
| 80% | | | | | | | | | | |
| 85% | | | | | | | | | | |
| 90% | | | | | | | | | | |
| 95% | | | | | | | | | | |
| 100% | | | | | | | | | | |

TABLE 4

Compressor Pressure Ratio

| R-23 content w/w | R-1132a content w/w | | | | | | | | | | |
|---|---|---|---|---|---|---|---|---|---|---|---|
| | 0% | 5% | 10% | 15% | 20% | 25% | 30% | 35% | 40% | 45% | 50% |
| 0% | 7.85 | 7.63 | 7.43 | 7.28 | 7.15 | 7.05 | 6.98 | 6.92 | 6.88 | 6.86 | 6.86 |
| 5% | 7.87 | 7.65 | 7.46 | 7.30 | 7.18 | 7.08 | 7.01 | 6.95 | 6.91 | 6.90 | 6.90 |
| 10% | 7.89 | 7.66 | 7.47 | 7.31 | 7.19 | 7.10 | 7.02 | 6.97 | 6.93 | 6.92 | 6.92 |
| 15% | 7.90 | 7.67 | 7.48 | 7.32 | 7.20 | 7.11 | 7.03 | 6.98 | 6.94 | 6.93 | 6.94 |
| 20% | 7.90 | 7.67 | 7.48 | 7.33 | 7.21 | 7.11 | 7.04 | 6.99 | 6.95 | 6.94 | 6.95 |
| 25% | 7.91 | 7.67 | 7.48 | 7.33 | 7.21 | 7.12 | 7.04 | 6.99 | 6.95 | 6.94 | 6.95 |
| 30% | 7.91 | 7.68 | 7.48 | 7.33 | 7.21 | 7.12 | 7.05 | 6.99 | 6.95 | 6.94 | 6.96 |
| 35% | 7.92 | 7.68 | 7.48 | 7.33 | 7.21 | 7.12 | 7.05 | 6.99 | 6.96 | 6.94 | 6.96 |
| 40% | 7.92 | 7.68 | 7.48 | 7.33 | 7.21 | 7.12 | 7.05 | 6.99 | 6.96 | 6.95 | 6.97 |
| 45% | 7.93 | 7.69 | 7.48 | 7.33 | 7.21 | 7.13 | 7.06 | 7.00 | 6.96 | 6.95 | 6.97 |
| 50% | 7.95 | 7.69 | 7.49 | 7.33 | 7.22 | 7.13 | 7.07 | 7.01 | 6.97 | 6.95 | 6.98 |
| 55% | 7.96 | 7.70 | 7.49 | 7.34 | 7.23 | 7.15 | 7.08 | 7.03 | 6.98 | 6.97 | |
| 60% | 7.98 | 7.71 | 7.50 | 7.35 | 7.24 | 7.17 | 7.10 | 7.05 | 7.01 | | |
| 65% | 8.00 | 7.73 | 7.51 | 7.36 | 7.26 | 7.19 | 7.14 | 7.09 | | | |
| 70% | 8.03 | 7.75 | 7.53 | 7.38 | 7.28 | 7.22 | 7.17 | | | | |

TABLE 4-continued

Compressor Pressure Ratio

| | | | | | | |
|---|---|---|---|---|---|---|
| 75% | 8.06 | 7.77 | 7.55 | 7.40 | 7.31 | 7.25 |
| 80% | 8.10 | 7.80 | 7.57 | 7.42 | 7.33 | |
| 85% | 8.14 | 7.84 | 7.59 | 7.44 | | |
| 90% | 8.19 | 7.87 | 7.61 | | | |
| 95% | 8.24 | 7.91 | | | | |
| 100% | 8.30 | | | | | |

| R-23 content | R-1132a content w/w | | | | | | | | |
|---|---|---|---|---|---|---|---|---|---|
| w/w | 55% | 60% | 65% | 70% | 75% | 80% | 85% | 90% | 95% | 100% |
| 0% | 6.87 | 6.90 | 6.93 | 6.97 | 7.02 | 7.06 | 7.11 | 7.16 | 7.21 | 7.26 |
| 5% | 6.92 | 6.95 | 6.99 | 7.04 | 7.09 | 7.14 | 7.20 | 7.27 | 7.33 | |
| 10% | 6.94 | 6.98 | 7.03 | 7.08 | 7.13 | 7.19 | 7.26 | 7.32 | | |
| 15% | 6.96 | 7.00 | 7.05 | 7.10 | 7.16 | 7.22 | 7.29 | | | |
| 20% | 6.97 | 7.02 | 7.07 | 7.12 | 7.18 | 7.24 | | | | |
| 25% | 6.98 | 7.03 | 7.09 | 7.14 | 7.20 | | | | | |
| 30% | 6.99 | 7.05 | 7.10 | 7.16 | | | | | | |
| 35% | 7.00 | 7.06 | 7.12 | | | | | | | |
| 40% | 7.02 | 7.08 | | | | | | | | |
| 45% | 7.03 | | | | | | | | | |
| 50% | | | | | | | | | | |
| 55% | | | | | | | | | | |
| 60% | | | | | | | | | | |
| 65% | | | | | | | | | | |
| 70% | | | | | | | | | | |
| 75% | | | | | | | | | | |
| 80% | | | | | | | | | | |
| 85% | | | | | | | | | | |
| 90% | | | | | | | | | | |
| 95% | | | | | | | | | | |
| 100% | | | | | | | | | | |

TABLE 5

Compressor Discharge Temperature in ° C.

| R-23 content | R-1132a content w/w | | | | | | | | | |
|---|---|---|---|---|---|---|---|---|---|---|
| w/w | 0% | 5% | 10% | 15% | 20% | 25% | 30% | 35% | 40% | 45% | 50% |
| 0% | −14.04 | −12.41 | −11.00 | −9.75 | −8.60 | −7.51 | −6.46 | −5.41 | −4.33 | −3.19 | −1.97 |
| 5% | −10.66 | −9.12 | −7.79 | −6.62 | −5.53 | −4.51 | −3.52 | −2.52 | −1.48 | −0.37 | 0.84 |
| 10% | −7.32 | −5.87 | −4.64 | −3.54 | −2.54 | −1.59 | −0.66 | 0.27 | 1.26 | 2.34 | 3.53 |
| 15% | −4.00 | −2.66 | −1.52 | −0.52 | 0.41 | 1.28 | 2.13 | 2.99 | 3.92 | 4.95 | 6.12 |
| 20% | −0.69 | 0.54 | 1.57 | 2.48 | 3.31 | 4.10 | 4.87 | 5.66 | 6.52 | 7.50 | 8.65 |
| 25% | 2.62 | 3.73 | 4.65 | 5.46 | 6.20 | 6.90 | 7.58 | 8.29 | 9.07 | 10.00 | 11.12 |
| 30% | 5.93 | 6.91 | 7.72 | 8.42 | 9.07 | 9.68 | 10.27 | 10.89 | 11.59 | 12.47 | 13.56 |
| 35% | 9.25 | 10.10 | 10.79 | 11.39 | 11.94 | 12.46 | 12.96 | 13.48 | 14.10 | 14.91 | 15.98 |
| 40% | 12.60 | 13.31 | 13.88 | 14.37 | 14.83 | 15.25 | 15.66 | 16.08 | 16.61 | 17.35 | 18.39 |
| 45% | 15.97 | 16.55 | 16.99 | 17.38 | 17.74 | 18.07 | 18.38 | 18.71 | 19.14 | 19.80 | 20.80 |
| 50% | 19.38 | 19.81 | 20.13 | 20.41 | 20.68 | 20.94 | 21.16 | 21.40 | 21.71 | 22.28 | 23.23 |
| 55% | 22.84 | 23.13 | 23.31 | 23.49 | 23.69 | 23.87 | 24.02 | 24.17 | 24.39 | 24.82 | |
| 60% | 26.35 | 26.49 | 26.55 | 26.63 | 26.76 | 26.88 | 26.99 | 27.09 | 27.21 | | |
| 65% | 29.93 | 29.91 | 29.84 | 29.84 | 29.91 | 30.00 | 30.08 | 30.15 | | | |
| 70% | 33.58 | 33.41 | 33.21 | 33.12 | 33.14 | 33.22 | 33.29 | | | | |
| 75% | 37.31 | 36.97 | 36.64 | 36.47 | 36.45 | 36.51 | | | | | |
| 80% | 41.12 | 40.61 | 40.13 | 39.87 | 39.81 | | | | | | |
| 85% | 45.01 | 44.32 | 43.68 | 43.31 | | | | | | | |
| 90% | 48.99 | 48.09 | 47.27 | | | | | | | | |
| 95% | 53.05 | 51.93 | | | | | | | | | |
| 100% | 57.19 | | | | | | | | | | |

| R-23 content | R-1132a content w/w | | | | | | | | |
|---|---|---|---|---|---|---|---|---|---|
| w/w | 55% | 60% | 65% | 70% | 75% | 80% | 85% | 90% | 95% | 100% |
| 0% | −0.67 | 0.68 | 2.06 | 3.44 | 4.78 | 6.09 | 7.34 | 8.54 | 9.69 | 10.78 |
| 5% | 2.15 | 3.53 | 4.94 | 6.35 | 7.73 | 9.08 | 10.39 | 11.67 | 12.91 | |
| 10% | 4.84 | 6.23 | 7.65 | 9.07 | 10.47 | 11.84 | 13.17 | 14.48 | | |
| 15% | 7.42 | 8.82 | 10.24 | 11.67 | 13.06 | 14.43 | 15.77 | | | |
| 20% | 9.94 | 11.33 | 12.76 | 14.18 | 15.56 | 16.91 | | | | |
| 25% | 12.41 | 13.80 | 15.22 | 16.63 | 18.00 | | | | | |
| 30% | 14.85 | 16.24 | 17.66 | 19.05 | | | | | | |
| 35% | 17.27 | 18.67 | 20.08 | | | | | | | |

TABLE 5-continued

Compressor Discharge Temperature in ° C.

| | | |
|---|---|---|
| 40% | 19.68 | 21.09 |
| 45% | 22.10 | |
| 50% | | |
| 55% | | |
| 60% | | |
| 65% | | |
| 70% | | |
| 75% | | |
| 80% | | |
| 85% | | |
| 90% | | |
| 95% | | |
| 100% | | |

TABLE 6

Bubble Point Pressure at −40° C. in kPa

| R-23 wt % | R-1132a wt % | | | | | | | | | | |
|---|---|---|---|---|---|---|---|---|---|---|---|
| | 0 | 5% | 10% | 15% | 20% | 25% | 30% | 35% | 40% | 45% | 50% |
| 0 | 540.1 | 579.0 | 610.3 | 635.5 | 655.5 | 671.4 | 683.8 | 693.4 | 700.5 | 705.7 | 709.2 |
| 5% | 563.4 | 604.1 | 637.2 | 664.0 | 685.6 | 703.0 | 716.9 | 728.0 | 736.7 | 743.5 | 748.7 |
| 10% | 584.0 | 626.4 | 661.0 | 689.2 | 712.1 | 730.8 | 746.0 | 758.3 | 768.3 | 776.3 | 782.8 |
| 15% | 602.2 | 646.1 | 682.0 | 711.4 | 735.5 | 755.2 | 771.4 | 784.7 | 795.7 | 804.8 | 812.4 |
| 20% | 618.3 | 663.4 | 700.5 | 731.0 | 756.0 | 776.6 | 793.7 | 807.9 | 819.7 | 829.6 | 838.0 |
| 25% | 632.4 | 678.7 | 716.8 | 748.2 | 774.1 | 795.5 | 813.2 | 828.1 | 840.5 | 851.1 | 860.1 |
| 30% | 644.8 | 692.2 | 731.2 | 763.4 | 790.0 | 812.0 | 830.4 | 845.8 | 858.8 | 869.8 | 879.4 |
| 35% | 655.7 | 704.0 | 743.8 | 776.7 | 803.9 | 826.6 | 845.4 | 861.3 | 874.7 | 886.2 | 896.1 |
| 40% | 665.2 | 714.3 | 754.9 | 788.5 | 816.3 | 839.4 | 858.7 | 875.0 | 888.7 | 900.5 | 910.8 |
| 45% | 673.4 | 723.4 | 764.7 | 798.8 | 827.1 | 850.7 | 870.4 | 887.0 | 901.1 | 913.2 | 923.7 |
| 50% | 680.4 | 731.2 | 773.2 | 807.9 | 836.7 | 860.7 | 880.8 | 897.7 | 912.1 | 924.4 | 935.0 |
| 55% | 686.5 | 738.1 | 780.7 | 816.0 | 845.3 | 869.6 | 890.0 | 907.2 | 921.8 | 934.4 | |
| 60% | 691.6 | 744.0 | 787.2 | 823.1 | 852.8 | 877.6 | 898.3 | 915.8 | 930.6 | | |
| 65% | 695.9 | 749.0 | 792.9 | 829.3 | 859.5 | 884.7 | 905.7 | 923.5 | | | |
| 70% | 699.3 | 753.3 | 797.9 | 834.8 | 865.5 | 891.0 | 912.5 | | | | |
| 75% | 702.1 | 756.8 | 802.1 | 839.6 | 870.8 | 896.8 | | | | | |
| 80% | 704.2 | 759.8 | 805.7 | 843.9 | 875.6 | | | | | | |
| 85% | 705.7 | 762.1 | 808.8 | 847.5 | | | | | | | |
| 90% | 706.5 | 763.8 | 811.3 | | | | | | | | |
| 95% | 706.7 | 764.9 | | | | | | | | | |
| 100% | 706.2 | | | | | | | | | | |

| R-23 wt % | R-1132a wt % | | | | | | | | | |
|---|---|---|---|---|---|---|---|---|---|---|
| | 55% | 60% | 65% | 70% | 75% | 80% | 85% | 90% | 95% | 100% |
| 0 | 711.2 | 711.8 | 711.3 | 709.7 | 706.9 | 703.1 | 698.1 | 692.0 | 684.4 | 675.4 |
| 5% | 752.4 | 755.0 | 756.6 | 757.2 | 757.0 | 755.9 | 754.0 | 751.2 | 747.5 | |
| 10% | 788.0 | 792.1 | 795.3 | 797.7 | 799.3 | 800.4 | 800.8 | 800.6 | | |
| 15% | 818.7 | 823.9 | 828.4 | 832.1 | 835.2 | 837.8 | 839.9 | | | |
| 20% | 845.1 | 851.3 | 856.6 | 861.4 | 865.6 | 869.3 | | | | |
| 25% | 867.9 | 874.8 | 880.8 | 886.3 | 891.3 | | | | | |
| 30% | 887.7 | 895.0 | 901.6 | 907.6 | | | | | | |
| 35% | 904.8 | 912.5 | 919.5 | | | | | | | |
| 40% | 919.7 | 927.7 | | | | | | | | |
| 45% | 932.9 | | | | | | | | | |
| 50% | | | | | | | | | | |
| 55% | | | | | | | | | | |
| 60% | | | | | | | | | | |
| 65% | | | | | | | | | | |
| 70% | | | | | | | | | | |
| 75% | | | | | | | | | | |
| 80% | | | | | | | | | | |
| 85% | | | | | | | | | | |
| 90% | | | | | | | | | | |
| 95% | | | | | | | | | | |
| 100% | | | | | | | | | | |

TABLE 7

Pure fluid vapour pressures at this condition

| | |
|---|---|
| R23 | 706.2 kPa |
| R1132a | 675.4 kPa |
| R116 | 540.1 kPa |
| Maximum | 706.2 kPa |

Compositions of R-1132a, R-23 and R-170

The performance of ternary compositions of the invention are provided in the following Tables 10 to 13, which list the volumetric cooling capacity, COP, compressor pressure ratio and compressor discharge temperature for a range of ternary compositions. The table ordinates are R-23 and R-170 content as weight percentages with the R-1132a content being inferred by difference.

The cycle conditions used in the modelling are as Table 1.

TABLE 9

Reference fluid performance - pure components

| | | R170 | R23 | R1132a | R508A |
|---|---|---|---|---|---|
| Evaporator pressure | bar | 1.23 | 0.85 | 0.93 | 1.11 |
| Condenser pressure | bar | 7.79 | 7.06 | 6.75 | 8.53 |
| Pressure ratio | | 6.33 | 8.30 | 7.26 | 7.71 |
| Volumetric efficiency | | 90.9% | 88.2% | 87.5% | 86.2% |
| Discharge temperature | °C. | 39.5 | 57.2 | 10.8 | 11.4 |
| Volumetric flowrate | m³/hr | 37.3 | 46.7 | 49.6 | 38.5 |
| Evaporator temperature glide | K | 0 | 0 | 0 | 0.4397 |
| Condenser temperature glide | K | 0 | 0 | 0 | 0.2223 |
| Volumetric capacity | kJ/m³ | 964 | 772 | 726 | 935 |
| Cooling COP | | 2.32 | 2.29 | 2.26 | 2.41 |

TABLE 10

Volumetric cooling capacity in kJ/m³

| R-170 w/w | R-23 w/w | | | | | | | | | | |
|---|---|---|---|---|---|---|---|---|---|---|---|
| | 0% | 5% | 10% | 15% | 20% | 25% | 30% | 35% | 40% | 45% | 50% |
| 0% | 726 | 744 | 761 | 778 | 794 | 809 | 823 | 835 | 847 | 856 | 864 |
| 5% | 789 | 812 | 834 | 856 | 877 | 899 | 919 | 939 | 958 | 975 | 991 |
| 10% | 843 | 869 | 895 | 922 | 948 | 974 | 1000 | 1026 | 1051 | 1075 | 1098 |
| 15% | 887 | 916 | 946 | 976 | 1007 | 1037 | 1068 | 1098 | 1128 | 1158 | 1186 |
| 20% | 923 | 956 | 989 | 1022 | 1056 | 1090 | 1125 | 1160 | 1194 | 1228 | 1261 |
| 25% | 953 | 988 | 1024 | 1060 | 1097 | 1135 | 1173 | 1212 | 1251 | 1291 | 1329 |
| 30% | 977 | 1014 | 1052 | 1091 | 1131 | 1172 | 1214 | 1256 | 1300 | 1344 | 1389 |
| 35% | 996 | 1035 | 1075 | 1116 | 1158 | 1202 | 1246 | 1292 | 1339 | 1387 | 1438 |
| 40% | 1009 | 1050 | 1092 | 1135 | 1179 | 1224 | 1270 | 1317 | 1366 | 1417 | 1470 |
| 45% | 1018 | 1060 | 1103 | 1148 | 1193 | 1239 | 1286 | 1334 | 1383 | 1434 | 1487 |
| 50% | 1024 | 1066 | 1111 | 1156 | 1202 | 1249 | 1297 | 1345 | 1393 | 1443 | 1493 |
| 55% | 1025 | 1069 | 1114 | 1160 | 1208 | 1255 | 1303 | 1351 | 1399 | 1446 | |
| 60% | 1024 | 1069 | 1115 | 1162 | 1211 | 1259 | 1308 | 1355 | 1402 | | |
| 65% | 1021 | 1066 | 1113 | 1162 | 1212 | 1262 | 1311 | 1359 | | | |
| 70% | 1016 | 1062 | 1111 | 1161 | 1213 | 1264 | 1315 | | | | |
| 75% | 1010 | 1056 | 1106 | 1159 | 1213 | 1267 | | | | | |
| 80% | 1002 | 1050 | 1102 | 1157 | 1214 | | | | | | |
| 85% | 994 | 1042 | 1096 | 1155 | | | | | | | |
| 90% | 984 | 1034 | 1090 | | | | | | | | |
| 95% | 975 | 1026 | | | | | | | | | |
| 100% | 964 | | | | | | | | | | |

| R-170 w/w | R-23 w/w | | | | | | | | | |
|---|---|---|---|---|---|---|---|---|---|---|
| | 55% | 60% | 65% | 70% | 75% | 80% | 85% | 90% | 95% | 100% |
| 0% | 869 | 871 | 871 | 867 | 860 | 850 | 837 | 820 | 798 | 772 |
| 5% | 1006 | 1018 | 1029 | 1037 | 1043 | 1049 | 1054 | 1059 | 1065 | |
| 10% | 1119 | 1139 | 1156 | 1172 | 1187 | 1203 | 1221 | 1243 | | |
| 15% | 1212 | 1236 | 1256 | 1274 | 1291 | 1307 | 1324 | | | |
| 20% | 1292 | 1319 | 1341 | 1358 | 1373 | 1386 | | | | |
| 25% | 1365 | 1395 | 1419 | 1435 | 1447 | | | | | |
| 30% | 1432 | 1470 | 1496 | 1511 | | | | | | |
| 35% | 1490 | 1541 | 1576 | | | | | | | |
| 40% | 1527 | 1589 | | | | | | | | |
| 45% | 1542 | | | | | | | | | |
| 50% | | | | | | | | | | |
| 55% | | | | | | | | | | |
| 60% | | | | | | | | | | |
| 65% | | | | | | | | | | |
| 70% | | | | | | | | | | |
| 75% | | | | | | | | | | |
| 80% | | | | | | | | | | |
| 85% | | | | | | | | | | |
| 90% | | | | | | | | | | |
| 95% | | | | | | | | | | |
| 100% | | | | | | | | | | |

TABLE 11

Cooling Coefficient of Performance (COP)

| R-170 w/w | R-23 w/w | | | | | | | | | |
|---|---|---|---|---|---|---|---|---|---|---|
| | 0% | 5% | 10% | 15% | 20% | 25% | 30% | 35% | 40% | 45% | 50% |
| 0% | 2.26 | 2.27 | 2.28 | 2.29 | 2.30 | 2.31 | 2.32 | 2.33 | 2.33 | 2.34 | 2.34 |
| 5% | 2.29 | 2.30 | 2.31 | 2.32 | 2.33 | 2.34 | 2.35 | 2.36 | 2.37 | 2.38 | 2.39 |
| 10% | 2.30 | 2.32 | 2.33 | 2.34 | 2.36 | 2.37 | 2.38 | 2.39 | 2.40 | 2.41 | 2.42 |
| 15% | 2.32 | 2.33 | 2.35 | 2.36 | 2.37 | 2.39 | 2.40 | 2.41 | 2.42 | 2.43 | 2.44 |
| 20% | 2.33 | 2.35 | 2.36 | 2.37 | 2.39 | 2.40 | 2.42 | 2.43 | 2.44 | 2.45 | 2.46 |
| 25% | 2.34 | 2.35 | 2.37 | 2.39 | 2.40 | 2.42 | 2.43 | 2.44 | 2.46 | 2.47 | 2.48 |
| 30% | 2.35 | 2.36 | 2.38 | 2.40 | 2.41 | 2.43 | 2.44 | 2.46 | 2.48 | 2.49 | 2.50 |
| 35% | 2.35 | 2.37 | 2.39 | 2.40 | 2.42 | 2.44 | 2.46 | 2.47 | 2.49 | 2.51 | 2.53 |
| 40% | 2.36 | 2.37 | 2.39 | 2.41 | 2.43 | 2.45 | 2.47 | 2.49 | 2.50 | 2.52 | 2.54 |
| 45% | 2.36 | 2.38 | 2.40 | 2.42 | 2.43 | 2.45 | 2.47 | 2.49 | 2.51 | 2.53 | 2.55 |
| 50% | 2.36 | 2.38 | 2.40 | 2.42 | 2.44 | 2.46 | 2.48 | 2.50 | 2.52 | 2.54 | 2.55 |
| 55% | 2.36 | 2.38 | 2.40 | 2.42 | 2.44 | 2.46 | 2.48 | 2.50 | 2.52 | 2.54 | |
| 60% | 2.36 | 2.38 | 2.40 | 2.42 | 2.44 | 2.47 | 2.49 | 2.51 | 2.52 | | |
| 65% | 2.35 | 2.37 | 2.40 | 2.42 | 2.45 | 2.47 | 2.49 | 2.51 | | | |
| 70% | 2.35 | 2.37 | 2.40 | 2.42 | 2.45 | 2.48 | 2.50 | | | | |
| 75% | 2.35 | 2.37 | 2.39 | 2.42 | 2.45 | 2.48 | | | | | |
| 80% | 2.34 | 2.36 | 2.39 | 2.42 | 2.46 | | | | | | |
| 85% | 2.34 | 2.36 | 2.39 | 2.43 | | | | | | | |
| 90% | 2.33 | 2.36 | 2.39 | | | | | | | | |
| 95% | 2.33 | 2.35 | | | | | | | | | |
| 100% | 2.32 | | | | | | | | | | |

| R-170 w/w | R-23 w/w | | | | | | | | | |
|---|---|---|---|---|---|---|---|---|---|---|
| | 55% | 60% | 65% | 70% | 75% | 80% | 85% | 90% | 95% | 100% |
| 0% | 2.35 | 2.35 | 2.35 | 2.35 | 2.35 | 2.34 | 2.33 | 2.32 | 2.31 | 2.29 |
| 5% | 2.40 | 2.40 | 2.41 | 2.41 | 2.41 | 2.42 | 2.42 | 2.42 | 2.43 | |
| 10% | 2.43 | 2.44 | 2.44 | 2.45 | 2.46 | 2.47 | 2.48 | 2.50 | | |
| 15% | 2.45 | 2.46 | 2.46 | 2.46 | 2.47 | 2.47 | 2.48 | | | |
| 20% | 2.47 | 2.47 | 2.47 | 2.47 | 2.46 | 2.46 | | | | |
| 25% | 2.49 | 2.49 | 2.48 | 2.47 | 2.46 | | | | | |
| 30% | 2.52 | 2.52 | 2.51 | 2.49 | | | | | | |
| 35% | 2.55 | 2.56 | 2.55 | | | | | | | |
| 40% | 2.57 | 2.59 | | | | | | | | |
| 45% | 2.57 | | | | | | | | | |
| 50% | | | | | | | | | | |
| 55% | | | | | | | | | | |
| 60% | | | | | | | | | | |
| 65% | | | | | | | | | | |
| 70% | | | | | | | | | | |
| 75% | | | | | | | | | | |
| 80% | | | | | | | | | | |
| 85% | | | | | | | | | | |
| 90% | | | | | | | | | | |
| 95% | | | | | | | | | | |
| 100% | | | | | | | | | | |

TABLE 12

Compressor Pressure Ratio

| R-170 w/w | R-23 w/w | | | | | | | | | |
|---|---|---|---|---|---|---|---|---|---|---|
| | 0% | 5% | 10% | 15% | 20% | 25% | 30% | 35% | 40% | 45% | 50% |
| 0% | 7.26 | 7.28 | 7.30 | 7.31 | 7.33 | 7.34 | 7.36 | 7.38 | 7.40 | 7.43 | 7.46 |
| 5% | 7.12 | 7.13 | 7.14 | 7.15 | 7.16 | 7.17 | 7.17 | 7.18 | 7.20 | 7.21 | 7.23 |
| 10% | 6.99 | 7.00 | 7.00 | 7.01 | 7.01 | 7.01 | 7.01 | 7.01 | 7.01 | 7.01 | 7.02 |
| 15% | 6.88 | 6.89 | 6.89 | 6.88 | 6.88 | 6.87 | 6.87 | 6.86 | 6.86 | 6.86 | 6.86 |
| 20% | 6.79 | 6.79 | 6.78 | 6.78 | 6.77 | 6.75 | 6.74 | 6.73 | 6.72 | 6.72 | 6.72 |
| 25% | 6.71 | 6.70 | 6.69 | 6.68 | 6.67 | 6.65 | 6.63 | 6.62 | 6.60 | 6.59 | 6.58 |
| 30% | 6.64 | 6.63 | 6.61 | 6.60 | 6.58 | 6.55 | 6.53 | 6.51 | 6.48 | 6.46 | 6.44 |
| 35% | 6.58 | 6.56 | 6.55 | 6.52 | 6.50 | 6.47 | 6.44 | 6.41 | 6.38 | 6.35 | 6.31 |
| 40% | 6.52 | 6.51 | 6.49 | 6.46 | 6.43 | 6.40 | 6.37 | 6.33 | 6.30 | 6.26 | 6.22 |
| 45% | 6.48 | 6.46 | 6.44 | 6.41 | 6.38 | 6.34 | 6.31 | 6.27 | 6.23 | 6.20 | 6.16 |
| 50% | 6.45 | 6.43 | 6.40 | 6.37 | 6.33 | 6.29 | 6.26 | 6.22 | 6.19 | 6.15 | 6.12 |
| 55% | 6.42 | 6.40 | 6.37 | 6.33 | 6.29 | 6.25 | 6.21 | 6.18 | 6.14 | 6.12 | |
| 60% | 6.40 | 6.38 | 6.34 | 6.30 | 6.26 | 6.21 | 6.17 | 6.13 | 6.11 | | |
| 65% | 6.38 | 6.36 | 6.32 | 6.27 | 6.22 | 6.17 | 6.13 | 6.09 | | | |
| 70% | 6.37 | 6.34 | 6.30 | 6.25 | 6.19 | 6.13 | 6.08 | | | | |

TABLE 12-continued

| | Compressor Pressure Ratio | | | | | |
|---|---|---|---|---|---|---|
| 75% | 6.36 | 6.33 | 6.28 | 6.22 | 6.15 | 6.08 |
| 80% | 6.35 | 6.32 | 6.26 | 6.19 | 6.10 | |
| 85% | 6.35 | 6.31 | 6.25 | 6.16 | | |
| 90% | 6.34 | 6.30 | 6.23 | | | |
| 95% | 6.34 | 6.30 | | | | |
| 100% | 6.33 | | | | | |

| R-170 | | | | R-23 w/w | | | | | | |
|---|---|---|---|---|---|---|---|---|---|---|
| w/w | 55% | 60% | 65% | 70% | 75% | 80% | 85% | 90% | 95% | 100% |
| 0% | 7.49 | 7.54 | 7.59 | 7.65 | 7.73 | 7.81 | 7.91 | 8.02 | 8.15 | 8.30 |
| 5% | 7.25 | 7.28 | 7.31 | 7.35 | 7.40 | 7.44 | 7.48 | 7.52 | 7.56 | |
| 10% | 7.03 | 7.05 | 7.07 | 7.09 | 7.11 | 7.12 | 7.11 | 7.07 | | |
| 15% | 6.87 | 6.89 | 6.91 | 6.95 | 6.97 | 7.00 | 7.00 | | | |
| 20% | 6.73 | 6.75 | 6.79 | 6.84 | 6.90 | 6.94 | | | | |
| 25% | 6.59 | 6.61 | 6.67 | 6.74 | 6.83 | | | | | |
| 30% | 6.43 | 6.44 | 6.50 | 6.61 | | | | | | |
| 35% | 6.28 | 6.25 | 6.29 | | | | | | | |
| 40% | 6.17 | 6.11 | | | | | | | | |
| 45% | 6.11 | | | | | | | | | |
| 50% | | | | | | | | | | |
| 55% | | | | | | | | | | |
| 60% | | | | | | | | | | |
| 65% | | | | | | | | | | |
| 70% | | | | | | | | | | |
| 75% | | | | | | | | | | |
| 80% | | | | | | | | | | |
| 85% | | | | | | | | | | |
| 90% | | | | | | | | | | |
| 95% | | | | | | | | | | |
| 100% | | | | | | | | | | |

TABLE 13

| | Compressor Discharge Temperature in ° C. | | | | | | | | | |
|---|---|---|---|---|---|---|---|---|---|---|
| R-170 | | | | | R-23 w/w | | | | | |
| w/w | 0% | 5% | 10% | 15% | 20% | 25% | 30% | 35% | 40% | 45% | 50% |
| 0% | 10.8 | 12.1 | 13.4 | 14.8 | 16.2 | 17.7 | 19.2 | 20.8 | 22.5 | 24.3 | 26.2 |
| 5% | 13.0 | 14.3 | 15.7 | 17.1 | 18.5 | 20.0 | 21.5 | 23.2 | 24.9 | 26.7 | 28.7 |
| 10% | 14.9 | 16.2 | 17.6 | 19.0 | 20.4 | 21.8 | 23.4 | 24.9 | 26.6 | 28.4 | 30.3 |
| 15% | 16.6 | 17.9 | 19.2 | 20.6 | 22.0 | 23.4 | 24.9 | 26.4 | 28.1 | 29.8 | 31.7 |
| 20% | 18.1 | 19.4 | 20.8 | 22.1 | 23.4 | 24.8 | 26.2 | 27.7 | 29.3 | 30.9 | 32.7 |
| 25% | 19.6 | 20.9 | 22.2 | 23.5 | 24.8 | 26.1 | 27.5 | 28.8 | 30.3 | 31.8 | 33.5 |
| 30% | 21.0 | 22.2 | 23.5 | 24.8 | 26.0 | 27.3 | 28.6 | 29.9 | 31.2 | 32.6 | 34.0 |
| 35% | 22.3 | 23.6 | 24.9 | 26.1 | 27.3 | 28.5 | 29.8 | 31.0 | 32.2 | 33.4 | 34.6 |
| 40% | 23.7 | 25.0 | 26.2 | 27.4 | 28.6 | 29.8 | 31.0 | 32.2 | 33.3 | 34.5 | 35.6 |
| 45% | 25.0 | 26.3 | 27.6 | 28.8 | 30.0 | 31.2 | 32.4 | 33.5 | 34.7 | 35.9 | 37.0 |
| 50% | 26.4 | 27.7 | 29.0 | 30.2 | 31.4 | 32.6 | 33.8 | 35.0 | 36.2 | 37.4 | 38.6 |
| 55% | 27.8 | 29.1 | 30.4 | 31.7 | 32.9 | 34.1 | 35.3 | 36.5 | 37.8 | 39.1 | |
| 60% | 29.2 | 30.6 | 31.9 | 33.1 | 34.3 | 35.5 | 36.8 | 38.0 | 39.3 | | |
| 65% | 30.6 | 32.0 | 33.3 | 34.5 | 35.7 | 36.9 | 38.2 | 39.5 | | | |
| 70% | 32.0 | 33.4 | 34.7 | 35.9 | 37.1 | 38.3 | 39.5 | | | | |
| 75% | 33.3 | 34.7 | 36.0 | 37.2 | 38.4 | 39.5 | | | | | |
| 80% | 34.6 | 36.1 | 37.4 | 38.5 | 39.6 | | | | | | |
| 85% | 35.9 | 37.4 | 38.6 | 39.7 | | | | | | | |
| 90% | 37.1 | 38.6 | 39.8 | | | | | | | | |
| 95% | 38.3 | 39.8 | | | | | | | | | |
| 100% | 39.5 | | | | | | | | | | |

| R-170 | | | | R-23 w/w | | | | | | |
|---|---|---|---|---|---|---|---|---|---|---|
| w/w | 55% | 60% | 65% | 70% | 75% | 80% | 85% | 90% | 95% | 100% |
| 0% | 28.3 | 30.6 | 33.0 | 35.7 | 38.6 | 41.7 | 45.1 | 48.8 | 52.8 | 57.2 |
| 5% | 30.8 | 33.1 | 35.6 | 38.4 | 41.3 | 44.5 | 48.0 | 51.6 | 55.5 | |
| 10% | 32.4 | 34.7 | 37.2 | 40.0 | 42.9 | 46.0 | 49.2 | 52.4 | | |
| 15% | 33.8 | 36.1 | 38.6 | 41.5 | 44.5 | 47.7 | 51.1 | | | |
| 20% | 34.8 | 37.1 | 39.8 | 42.8 | 46.0 | 49.5 | | | | |
| 25% | 35.4 | 37.7 | 40.5 | 43.7 | 47.3 | | | | | |

TABLE 13-continued

Compressor Discharge Temperature in ° C.

| | | | | |
|---|---|---|---|---|
| 30% | 35.7 | 37.7 | 40.5 | 44.0 |
| 35% | 35.9 | 37.3 | 39.7 | |
| 40% | 36.6 | 37.5 | | |
| 45% | 38.1 | | | |
| 50% | | | | |
| 55% | | | | |
| 60% | | | | |
| 65% | | | | |
| 70% | | | | |
| 75% | | | | |
| 80% | | | | |
| 85% | | | | |
| 90% | | | | |
| 95% | | | | |
| 100% | | | | |

It can be seen that by using compositions of the invention it is possible to achieve improvements in capacity and COP compared to the pure fluid performances and also to achieve reduced compressor pressure ratio. Furthermore it is possible to achieve compressor discharge temperatures that are lower than those to be expected from use of R-508A or R-508B.

Compositions of R-1132a, R23 and Carbon Dioxide

Figure 1:
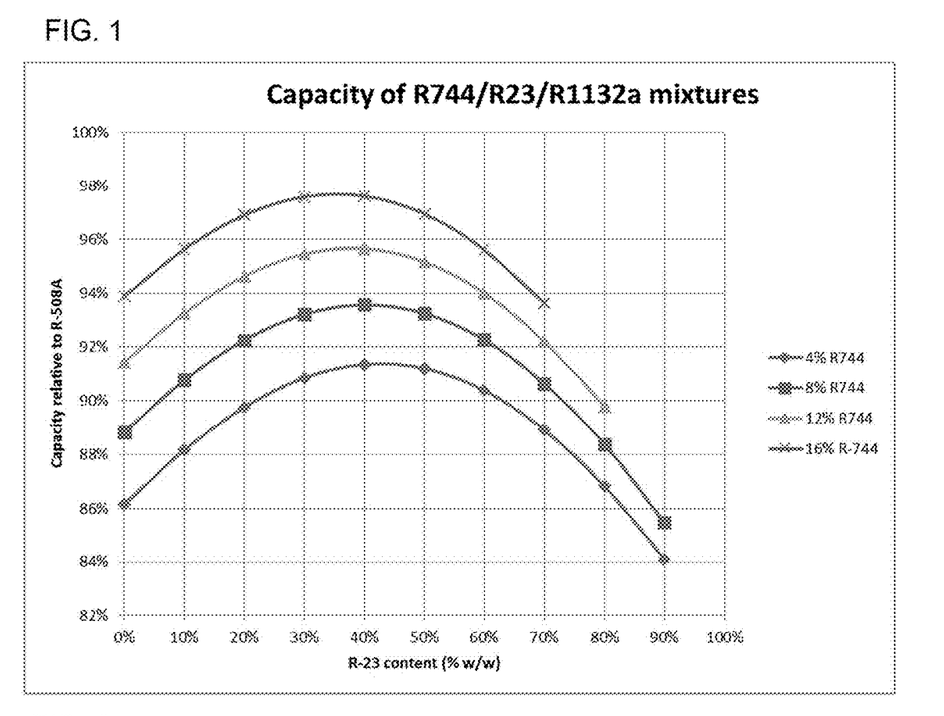
FIG. 1 shows a plot of R-23 concentration against capacity relative to R-508A for compositions of R-1132a, R-23 and carbon dioxide.
Figure 2:
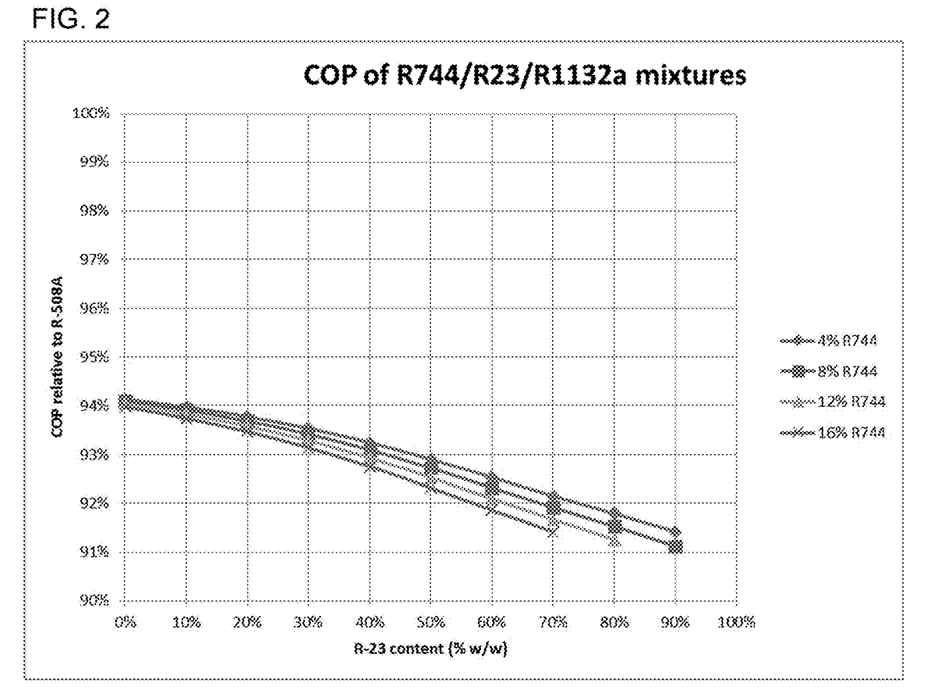
FIG. 2 shows a plot of R-23 concentration against coefficient of performance relative to R-508A for compositions of R-1132a, R-23 and carbon dioxide.

The performance of ternary compositions of the invention are provided in the following Tables 15 to 18, which list performance characteristics for a range of ternary compositions. Plots of capacity and coefficient of performance of the compositions relative to R-508A against R-23 concentration are shown in FIGS. 1 and 2.

The cycle conditions used in the modelling are as Table 1.

TABLE 14

Calculated performance of reference (r508b) and pure components

| | | R508A | R1132a | R23 |
|---|---|---|---|---|
| Capacity relative to reference | | 100.0% | 83.4% | 79.3% |
| COP relative to reference | | 100.0% | 94.2% | 91.3% |
| Discharge temperature difference (K) | | 0.0 | −3.8 | 46.1 |
| Pressure ratio | — | 7.71 | 6.74 | 8.35 |
| Condenser glide | K | 0.2 | 0.0 | 0.0 |
| Evaporator glide | K | 0.4 | 0.0 | 0.0 |
| Condensing pressure | bar | 8.53 | 7.01 | 7.06 |
| Evaporating pressure | bar | 1.11 | 1.04 | 0.85 |
| COP | — | 2.41 | 2.27 | 2.20 |
| Discharge temperature | ° C. | 11.4 | 7.6 | 57.5 |
| Volumetric capacity | kJ/m3 | 935 | 780 | 742 |

TABLE 15

| | | $CO_2$ | | | | | | | | | |
|---|---|---|---|---|---|---|---|---|---|---|---|
| | | 4% | 4% | 4% | 4% | 4% | 4% | 4% | 4% | 4% | 4% |
| | | R23 | | | | | | | | | |
| | | 0% | 10% | 20% | 30% | 40% | 50% | 60% | 70% | 80% | 90% |
| | | R1132a | | | | | | | | | |
| Quantity | Units | 96% | 86% | 76% | 66% | 56% | 46% | 36% | 26% | 16% | 6% |
| Capacity relative to reference | | 86.2% | 88.2% | 89.8% | 90.8% | 91.3% | 91.2% | 90.4% | 88.9% | 86.8% | 84.1% |
| COP relative to reference | | 94.1% | 94.0% | 93.8% | 93.5% | 93.3% | 92.9% | 92.5% | 92.2% | 91.8% | 91.4% |
| Discharge temperature difference (K) | | −1.5 | 1.3 | 4.4 | 7.9 | 11.9 | 16.4 | 21.7 | 27.8 | 34.7 | 42.5 |
| Pressure ratio | — | 6.8 | 6.8 | 6.9 | 7.0 | 7.1 | 7.3 | 7.4 | 7.6 | 7.9 | 8.1 |
| Condenser glide | K | 0.4 | 0.4 | 0.4 | 0.3 | 0.2 | 0.2 | 0.2 | 0.3 | 0.4 | 0.4 |
| Evaporator glide | K | 0.2 | 0.2 | 0.1 | 0.1 | 0.1 | 0.2 | 0.4 | 0.6 | 0.6 | 0.5 |
| Condensing pressure | bar | 7.23 | 7.41 | 7.56 | 7.68 | 7.75 | 7.79 | 7.78 | 7.71 | 7.60 | 7.42 |
| Evaporating pressure | bar | 1.07 | 1.08 | 1.09 | 1.10 | 1.09 | 1.07 | 1.04 | 1.01 | 0.96 | 0.91 |
| COP | — | 2.27 | 2.26 | 2.26 | 2.25 | 2.25 | 2.24 | 2.23 | 2.22 | 2.21 | 2.20 |
| Discharge temperature | ° C. | 9.9 | 12.7 | 15.8 | 19.3 | 23.3 | 27.8 | 33.1 | 39.2 | 46.1 | 53.9 |
| Volumetric capacity | kJ/m³ | 806 | 824 | 839 | 849 | 854 | 853 | 845 | 831 | 812 | 786 |

TABLE 16

| | | R744 | | | | | | | | | |
|---|---|---|---|---|---|---|---|---|---|---|---|
| | | 8% | 8% | 8% | 8% | 8% | 8% | 8% | 8% | 8% | 8% |
| | | R23 | | | | | | | | | |
| | | 0% | 10% | 20% | 30% | 40% | 50% | 60% | 70% | 80% | 90% |
| | | R1132a | | | | | | | | | |
| Quantity | Units | 92% | 82% | 72% | 62% | 52% | 42% | 32% | 22% | 12% | 2% |
| Capacity relative to reference | | 88.8% | 90.8% | 92.3% | 93.2% | 93.6% | 93.3% | 92.3% | 90.6% | 88.4% | 85.5% |
| COP relative to reference | | 94.1% | 93.9% | 93.7% | 93.4% | 93.1% | 92.7% | 92.3% | 91.9% | 91.5% | 91.1% |
| Discharge temperature difference (K) | | 0.8 | 3.7 | 7.0 | 10.7 | 14.9 | 19.8 | 25.4 | 31.8 | 39.2 | 47.6 |
| Pressure ratio | — | 6.8 | 6.9 | 6.9 | 7.0 | 7.2 | 7.3 | 7.5 | 7.7 | 7.9 | 8.2 |
| Condenser glide | K | 0.7 | 0.7 | 0.6 | 0.5 | 0.4 | 0.4 | 0.4 | 0.5 | 0.6 | 0.6 |
| Evaporator glide | K | 0.3 | 0.2 | 0.2 | 0.2 | 0.2 | 0.3 | 0.5 | 0.7 | 0.7 | 0.5 |
| Condensing pressure | bar | 7.45 | 7.62 | 7.76 | 7.87 | 7.94 | 7.97 | 7.94 | 7.87 | 7.74 | 7.55 |
| Evaporating pressure | bar | 1.10 | 1.11 | 1.12 | 1.12 | 1.11 | 1.09 | 1.06 | 1.02 | 0.97 | 0.92 |
| COP | — | 2.27 | 2.26 | 2.26 | 2.25 | 2.24 | 2.23 | 2.22 | 2.22 | 2.21 | 2.20 |
| Discharge temperature | ° C. | 12.2 | 15.1 | 18.4 | 22.1 | 26.3 | 31.2 | 36.8 | 43.2 | 50.6 | 59.0 |
| Volumetric capacity | kJ/m$^3$ | 831 | 849 | 863 | 872 | 875 | 872 | 863 | 847 | 826 | 799 |

TABLE 17

| | | R744 | | | | | | | | |
|---|---|---|---|---|---|---|---|---|---|---|
| | | 12% | 12% | 12% | 12% | 12% | 12% | 12% | 12% | 12% |
| | | R23 | | | | | | | | |
| | | 0% | 10% | 20% | 30% | 40% | 50% | 60% | 70% | 80% |
| | | R1132a | | | | | | | | |
| Quantity | Units | 88% | 78% | 68% | 58% | 48% | 38% | 28% | 18% | 8% |
| Capacity relative to reference | | 91.4% | 93.3% | 94.6% | 95.5% | 95.7% | 95.2% | 94.0% | 92.2% | 89.8% |
| COP relative to reference | | 94.0% | 93.8% | 93.6% | 93.3% | 92.9% | 92.5% | 92.1% | 91.7% | 91.3% |
| Discharge temperature difference (K) | | 3.2 | 6.2 | 9.6 | 13.5 | 18.0 | 23.2 | 29.2 | 36.0 | 43.9 |
| Pressure ratio | — | 6.8 | 6.9 | 7.0 | 7.1 | 7.2 | 7.4 | 7.6 | 7.8 | 8.0 |
| Condenser glide | K | 0.9 | 0.8 | 0.7 | 0.6 | 0.5 | 0.5 | 0.5 | 0.6 | 0.7 |
| Evaporator glide | K | 0.4 | 0.3 | 0.2 | 0.2 | 0.3 | 0.4 | 0.6 | 0.7 | 0.7 |
| Condensing pressure | bar | 7.65 | 7.82 | 7.95 | 8.05 | 8.12 | 8.13 | 8.10 | 8.01 | 7.87 |
| Evaporating pressure | bar | 1.12 | 1.13 | 1.14 | 1.14 | 1.13 | 1.10 | 1.07 | 1.03 | 0.98 |
| COP | — | 2.27 | 2.26 | 2.26 | 2.25 | 2.24 | 2.23 | 2.22 | 2.21 | 2.20 |
| Discharge temperature | ° C. | 14.6 | 17.6 | 21.0 | 24.9 | 29.4 | 34.6 | 40.6 | 47.4 | 55.3 |
| Volumetric capacity | kJ/m$^3$ | 855 | 872 | 885 | 893 | 894 | 890 | 879 | 862 | 839 |

TABLE 18

| | | R744 | | | | | | | |
|---|---|---|---|---|---|---|---|---|---|
| | | 16% | 16% | 16% | 16% | 16% | 16% | 16% | 16% |
| | | R23 | | | | | | | |
| | | 0% | 10% | 20% | 30% | 40% | 50% | 60% | 70% |
| | | R1132a | | | | | | | |
| Quantity | Units | 84% | 74% | 64% | 54% | 44% | 34% | 24% | 14% |
| Capacity relative to reference | | 93.9% | 95.6% | 96.9% | 97.6% | 97.6% | 96.9% | 95.6% | 93.6% |
| COP relative to reference | | 94.0% | 93.7% | 93.5% | 93.1% | 92.8% | 92.3% | 91.9% | 91.4% |
| Discharge temperature difference (K) | | 5.5 | 8.7 | 12.3 | 16.5 | 21.2 | 26.8 | 33.1 | 40.4 |
| Pressure ratio | — | 6.9 | 6.9 | 7.0 | 7.1 | 7.3 | 7.4 | 7.6 | 7.8 |
| Condenser glide | K | 1.0 | 0.9 | 0.8 | 0.6 | 0.6 | 0.5 | 0.6 | 0.7 |
| Evaporator glide | K | 0.4 | 0.3 | 0.3 | 0.3 | 0.3 | 0.5 | 0.7 | 0.8 |
| Condensing pressure | bar | 7.85 | 8.01 | 8.14 | 8.23 | 8.28 | 8.29 | 8.24 | 8.14 |
| Evaporating pressure | bar | 1.15 | 1.16 | 1.16 | 1.16 | 1.14 | 1.12 | 1.08 | 1.04 |
| COP | — | 2.26 | 2.26 | 2.25 | 2.24 | 2.24 | 2.22 | 2.21 | 2.20 |

TABLE 18-continued

| | | R744 | | | | | | | |
|---|---|---|---|---|---|---|---|---|---|
| | | 16% | 16% | 16% | 16% | 16% | 16% | 16% | 16% |
| | | R23 | | | | | | | |
| | | 0% | 10% | 20% | 30% | 40% | 50% | 60% | 70% |
| | | R1132a | | | | | | | |
| Quantity | Units | 84% | 74% | 64% | 54% | 44% | 34% | 24% | 14% |
| Discharge temperature | °C. | 16.9 | 20.1 | 23.7 | 27.9 | 32.6 | 38.2 | 44.5 | 51.8 |
| Volumetric capacity | kJ/m$^3$ | 878 | 894 | 906 | 912 | 913 | 906 | 894 | 876 |

This data shows that ternary compositions of R-1132a, R23 and carbon dioxide are suitable as drop-in replacements for R-508 compositions. In particular it is noted that compositions including about 20 to about 60% by weight R-23 provide for both an optimised capacity, which when combined with flammability reducing characteristics of R-23 may be particularly desirable.

Preferences and options for a given aspect, feature or parameter of the invention should, unless the context indicates otherwise, be regarded as having been disclosed in combination with any and all preferences and options for all other aspects, features and parameters of the invention.

The invention is defined by the following claims.

The invention claimed is:

1. A refrigeration system comprising a composition, the composition comprising:
   i) 1,1-difluoroethene (vinylidene fluoride, R-1132a);
   ii) trifluoromethane (R-23); and
   iii) one or more compound selected from hexafluoroethane (R-116) and ethane (R-170); and
   iv) about 4% to about 8% of dioxide (R-744, CO$_2$).

2. The refrigeration system of claim 1, wherein the composition comprises from about 1 to about 98% by weight R-1132a.

3. The refrigeration system of claim 1, wherein the composition comprises from about 1 to about 98% by weight R-23.

4. The refrigeration system of claim 3, wherein the composition comprises about 20 to about 60% by weight R-23.

5. The refrigeration system of claim 1, wherein the composition comprises up to about 80% by weight R-116.

6. The refrigeration system of claim 1, wherein the composition comprises
   from about 1 to about 40% by weight R-116, from about 5 to about 98% by weight R-1132a and from about 5 to about 98% by weight R-23; or
   from about 1 to about 30% by weight R-116, from about 20 to about 90% by weight R-1132a and from about 5 to about 95% by weight R-23; or
   from about 1 to about 25% by weight R-116, from about 30 to about 80% by weight R-1132a and from about 5 to about 90% by weight R-23.

7. The refrigeration system of claim 1, wherein the composition comprises up to about 40% by weight R-170.

8. The refrigeration system of claim 1, wherein the refrigeration system cools a compartment to less than −70° C.

9. The refrigeration system of claim 1, wherein the composition is less flammable than R-1132a alone.

10. The refrigeration system of claim 1, further comprising a lubricant selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

11. The refrigeration system of claim 1, further comprising a stabiliser selected from the group consisting of diene-based compounds, phosphates, phenol compounds, epoxides, and mixtures thereof.

12. The refrigeration system of claim 1, further comprising a flame retardant selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines, and mixtures thereof.

13. A heat transfer device containing a composition, the composition comprising:
   i) 1,1-difluoroethene (vinylidene fluoride, R-1132a);
   ii) trifluoromethane (R-23); and
   iii) one or more compound selected from hexafluoroethane (R-116) and ethane (R-170); and
   iv) about 4% to about 8% of dioxide (R-744, CO$_2$).

14. The heat transfer device of claim 13, wherein the heat transfer device is a refrigeration device selected from an ultra-low temperature refrigeration system and a cascade system.

15. A method for reducing the environmental impact arising from the operation of a product comprising an existing compound or composition, the method comprising replacing at least partially the existing compound or composition with a composition comprising:
   i) 1,1-difluoroethene (vinylidene fluoride, R-1132a);
   ii) trifluoromethane (R-23); and
   iii) one or more compound selected from hexafluoroethane (R-116) and ethane (R-170); and
   iv) about 4% to about 8% of dioxide (R-744, CO$_2$).

16. The method of claim 15 wherein the product is selected from a heat transfer device, a sprayable composition, a solvent or a mechanical power generation device.

17. The method of claim 15 wherein the product is an ultra-low temperature refrigeration system, optionally wherein the existing compound or composition is selected from R-508A, R-508B, R-23 and R-1361.

* * * * *

UNITED STATES PATENT AND TRADEMARK OFFICE
CERTIFICATE OF CORRECTION

PATENT NO. : 11,560,502 B2
APPLICATION NO. : 17/352775
DATED : January 24, 2023
INVENTOR(S) : Robert E. Low et al.

It is certified that error appears in the above-identified patent and that said Letters Patent is hereby corrected as shown below:

In the Specification

Column 1, Line 13, delete "R-1361." and insert in its place --R-13B1.--.

Column 10, Line 48, delete "R-1361." and insert in its place --R-13B1.--.

In the Claims

Column 29, Claim 1, Line 35, insert --carbon-- between "of" and "dioxide".

Column 30, Claim 13, Line 41, insert --carbon-- between "of" and "dioxide".

Column 30, Claim 15, Line 55, insert --carbon-- between "of" and "dioxide".

Column 30, Claim 17, Line 62, delete "R-1361." and insert in its place --R-13B1.--.

Signed and Sealed this
Twenty-third Day of May, 2023

Katherine Kelly Vidal
*Director of the United States Patent and Trademark Office*